United States Patent
Blandy

(10) Patent No.: US 7,461,220 B2
(45) Date of Patent: *Dec. 2, 2008

(54) FREE ITEM DISTRIBUTION AMONG MULTIPLE FREE LISTS DURING GARBAGE COLLECTION FOR MORE EFFICIENT OBJECT ALLOCATION

(75) Inventor: Geoffrey Owen Blandy, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/032,739

(22) Filed: Feb. 18, 2008

(65) Prior Publication Data

US 2008/0140738 A1    Jun. 12, 2008

Related U.S. Application Data

(60) Continuation of application No. 11/548,922, filed on Oct. 12, 2006, now Pat. No. 7,370,162, which is a division of application No. 10/862,151, filed on Jun. 4, 2004, now Pat. No. 7,149,866.

(51) Int. Cl.
*G06F 12/00* (2006.01)

(52) U.S. Cl. .............. 711/159; 711/170; 707/200; 707/206

(58) Field of Classification Search ........... 711/159, 711/170; 707/200, 206
See application file for complete search history.

(56) References Cited

U.S. PATENT DOCUMENTS

2004/0073764 A1* 4/2004 Andreasson ............. 711/170
2005/0234974 A1* 10/2005 Bailey et al. ............ 707/103 R

* cited by examiner

*Primary Examiner*—Reba I Elmore
(74) *Attorney, Agent, or Firm*—Matthew W. Baca; Amy J. Pattillo

(57) ABSTRACT

A garbage collector predicts future allocation requirements and then distributes free items to multiple subpool free lists and a TLH free list during the sweep phase according to the future allocation requirements. The sizes of subpools and number of free items in subpools are predicted as the most likely to match future allocation requests. Once a subpool free list is filled with the number of free items needed according to the future allocation requirements, any additional free items designated for the subpool free list can be divided into multiple TLH sized free items and placed on the TLH free list. Allocation threads are enabled to acquire free items from the TLH free list and to replenish a current TLH without acquiring heap lock.

8 Claims, 11 Drawing Sheets

FREE ITEM DISTRIBUTION AMONG MULTIPLE FREE LISTS DURING GARBAGE COLLECTION FOR MORE EFFICIENT OBJECT ALLOCATION

CROSS-REFERENCE TO RELATED APPLICATIONS

This application is a continuation of commonly assigned U.S. patent application Ser. No. 11/548,922, filed Oct. 12, 2006, which is a divisional of U.S. patent application Ser. No. 10/862,151, filed Jun. 4, 2004, which are hereby incorporated herein by reference.

BACKGROUND OF THE INVENTION

1. Technical Field

The present invention relates in general to improved heap management and in particular to improved efficiency of heap management by a virtual manager in a multiprocessor system. Still more particularly, the present invention relates to improved free item distribution among multiple free lists during garbage collection to improve memory usage and to increase the frequency of allocations from thread-local heaps.

2. Description of the Related Art

Software systems, such as the Java Virtual Machine (JVM) that employ garbage collection, typically provide an explicit call for allocating objects, but no explicit call for freeing objects. Instead, in a system that employs garbage collection, when available storage on a heap is exhausted, an allocation failure occurs, operations are suspended, and garbage collection is invoked to replenish the free storage.

In one example, the JVM employs a mark and sweep phases during garbage collection to replenish the free storage. During a mark phase, items that are still referenced are located and marked. Then, during the sweep phase, free space of sufficient size is located and added as free items to a free list. Free items that are not large enough to be added to the free list are discarded. A free list may include a linked list of freed items, for example, with a pointer to the first item in the list held in global memory.

In addition, during garbage collection, compaction may occur. Compaction, in general, requires adjusting the position of objects within the heap to reduce fragmentation and attempt to make larger free items available. A forced compaction may occur if the sweep phase completes without finding a sufficiently large free item for the allocation request.

When an allocation request is received, a heap lock is acquired and the free list is scanned to locate a free item of sufficient size to meet the allocation request. If a free item of sufficient size is available on the list, it is popped from the list so that the new object can be allocated at the free item location. If a free item of sufficient size is not available, then garbage collection is initiated again to replenish the free list.

Because the heap lock is an exclusive lock and is acquired to search a free list, it is important that free items are efficiently located and popped from the list during allocation and, in particular, that the free list can be efficiently scanned to determine if a free item is available. In addition, because garbage collection is time consuming, it is important that larger items are not prematurely popped from the free list such that premature garbage collection is initiated. In particular, a premature garbage collection may occur if an allocation failure occurs and there is a large amount of free storage available, but no single free item large enough to satisfy the allocation request.

In an attempt to reduce the chance of premature garbage collection and reduce free list scanning time, some JVM's implement a large object area (LOA) or other large object protection area within the heap, where the LOA includes objects that are greater than a large object size threshold. Objects within the LOA are typically not allocated unless the requested allocation size is larger than the large object size threshold in an attempt to reduce premature garbage collection when large object requests are received.

In addition, in an attempt to increase the efficiency of searching for a free item, some JVM's implement multiple free lists, where each free list holds free items of a particular size. A vector maintains the list of sizes, wherein the list of sizes is scanned to locate a particular sized free list and then that sized free list is scanned for a free item of sufficient size for the allocation request, rather than requiring a scan of each item of a free list. While multiple free lists organized by a searchable vector reduce the number of free items that must be searched, searching a free list requires acquiring a heap lock.

Further, in an attempt to increase the efficiency of allocations of smaller objects, thread-local heaps (TLHs) may be implemented. In one example, a TLH is a cache buffer that has been previously reserved for use by a single thread. TLHs are advantageous because objects can be allocated directly to a TLH without the thread grabbing a heap lock. Furthermore, TLH's typically employ simple and fast allocation schemes, such as pointer bumping. Thus, it is advantageous to allocate as often as possible from the TLH, rather than searching from general free lists.

While allocating from a TLH is most efficient for smaller objects, when the current TLH does not have sufficient space to satisfy an allocation request, but the allocation request is within the size boundaries of a TLH, the heap lock must still be acquired to search the free list for a free item of sufficient size. The current TLH is replaced by a free item popped from a general free list. In addition, if an allocation request size exceeds the size boundaries of a TLH, the heap lock must still be acquired and the free lists must be searched to find a free item large enough to satisfy the request size. Thus, while implementing TLHs may improve efficiency of allocations when the requested allocation fits within the current TLH, current object allocation is still limited when the current TLH does not satisfy the allocation request.

Another issue arises in TLH allocation because the majority of requests for free items from the heap manager become requests for TLH replenishments. As a result, the free lists with smaller free items that are also large enough for TLH allocation will quickly be depleted, leading to premature garbage collection as larger items are carved up to meet normal smaller object allocation requests. One solution to the smaller free item depletion problem has been to increase the size of TLH's, however merely increasing the size only adjusts the low value of the range of free list sizes that are most quickly depleted by TLH requests, still leading to premature garbage collection when other allocation requests within the TLH size range are received.

Therefore, in view of the foregoing, there is a need for a method, system, and program for improving free item distribution among free lists to avoid premature depletion from TLH requests by using recent allocation history to predict future allocation requirements and distributing free items among free lists to meet the predicted future allocation requirements. In addition, to increase the efficiency of object allocation, there is a need for a method, system, and program for avoiding the acquisition of heap lock and in particular avoiding the acquisition of heap lock during TLH replenishment.

SUMMARY OF THE INVENTION

Therefore a system and program provide improved heap management and provide improved efficiency of heap management by a virtual manager in a multiprocessor system. A system and program provide improved free item distribution among multiple free lists during garbage collection to increase the frequency of allocations from thread-local heaps and improve memory usage.

According to one embodiment, a heap manager includes a TLH free list and multiple subpool free lists that are quickly searchable through a vector of subpool sizes. The TLH free list is accessible to all the application threads for replenishing TLH's. Application threads need not acquire the heap lock, but only need to ensure that garbage collection is blocked, when searching the TLH free list for a free item to replenish the thread's TLH. The TLH free list is filled such that TLH's are replenished most often from the TLH free list. If the TLH free list is empty, then the thread acquires the heap lock and search a size vector identifying the sizes of multiple subpool free lists to efficiently locate a free item of sufficient size for TLH replenishment.

According to another embodiment, a garbage collector predicts future allocation requirements and then distributes free items to the multiple subpool free lists and TLH free list during the sweep phase according to the future allocation requirements. Free items are distributed among free lists, the sizes of which are predicted to most likely match the sizes of future allocation requests. Once a subpool free list is filled with the number of free items needed based on the future allocation requirements, any additional free items designated for the subpool free list are divided into multiple TLH sized free items and placed on the TLH free list. To minimize fragmentation and increase the average TLH size, subpool free lists are filled with the best fitting free items and larger items tend to be assigned to the TLH free list.

Responsive to detecting an end of a cycle, a recent allocation history of the allocations from the multiple subpool free lists is accumulated from multiple allocation threads. Future allocation requirements are then predicted from the recent allocation history and a prior allocation history. Then, the number of free lists, the size associated with each free list and the number of entries need in each free list are dynamically adjusted to reflect the future allocation requirements for efficient memory usage.

Accumulating the recent allocation history includes accumulating multiple hit counters, where each hit counter identifies a number of hits for each existing subpool and a number of hits for candidate sub pools. Any candidate subpool with less than a threshold number of hits is discarded. Then, the existing subpool list is combined with the candidate subpool list to predict the needed sizes of free lists. If too many sizes are in the combined list, then the sub pools with the least number of hits are discarded.

The total number of hits accumulated for each subpool size is used as the prediction of future allocation requirements, and are smoothed to reflect prior allocation history. Accumulating recent allocation history also includes accumulating the total number of bytes allocated since the last cycle. If the total number of bytes allocated since the last cycle less the total free space previously available exceeds a threshold, then a ratio is calculated and the total number of hits for each subpool size are adjusted by the ratio. Further, the current total number of hits for an existing subpool are smoothed by averaging the current total number of hits with a previous smoothed number of hits for the existing subpool.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
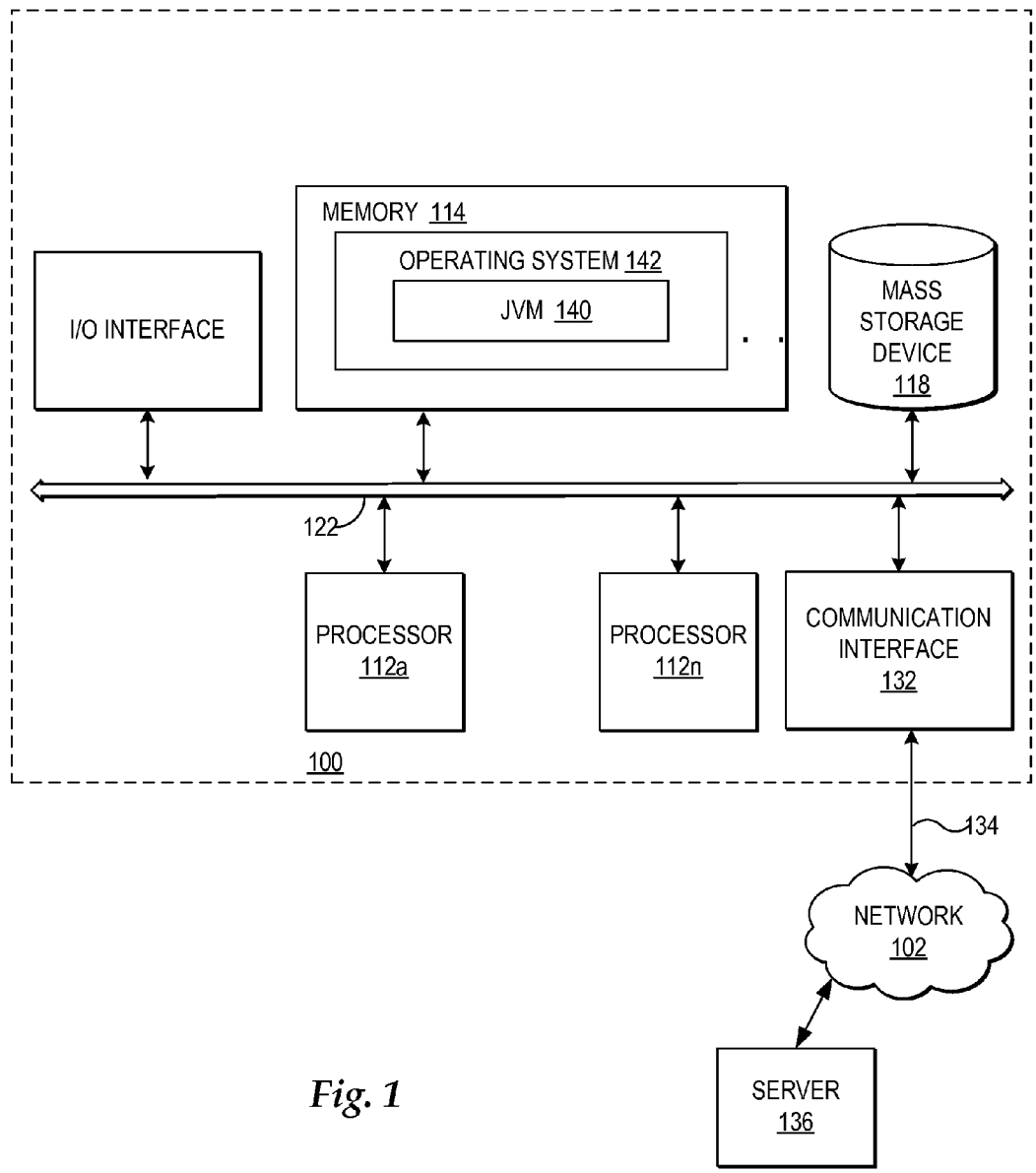
FIG. 1 is a block diagram depicting one embodiment of the hardware and software implemented in a computer system through which the present method, system, and program may be implemented

Referring now to the drawings and in particular to FIG. 1, there is depicted one embodiment of the hardware and software implemented in a computer system through which the present method, system, and program may be implemented. The present invention may be executed in a variety of systems, including a variety of computing systems and electronic devices.

Computer system 100 generally includes a bus 122 or other communication device for communicating information within computer system 100, and at least one processing device, such as processor 112a, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors, such as processors 112a-112n that operate in parallel to improve network servicing power.

Processors 112a-112n may be general-purpose or specified purpose processors that, during normal operation, operate under the control of one or more of a number of different operating systems, such as operating system 142, and execute various computer software applications, programs, objects, modules and other processes from a memory 114. Although not depicted, memory 114 may include dynamic storage such as random access memory (RAM) and static storage such as Read Only Memory (ROM). In addition, although not depicted, each of processors 112a-112n may include levels of cache and registers local to a central processing unit.

In one embodiment, a Java Virtual Machine (JVM) 140 is loaded in memory on top of operating system 132. JVM 140 appears as an application to (native) operating system 142, but in fact functions as a virtual operating system, supporting Java applications. In particular, Java applications are preferably portable applications that when run by JVM 140, can run on any platform, regardless of operating system or hardware specifications. Although not depicted, JVM 140 compiles byte code from Java applications and a Java interpreter converts the byte code into instructions understandable by operating system 142. The components of JVM 140 may be incorporated into a standalone application, a part of an operating system, or a part of a larger application, such as a browser application or middleware. In an alternate embodiment, JVM 140 and any of the components of JVM 140 may, at different times, be resident in whole or in part in any of memory 114, mass storage device 118, network 102, or within registers or cache of processors 112a-112n or other processor registers and cache.

In one embodiment, operating system software or JVM 140 contains machine executable instructions that when executed on processor 112 carry out the operations depicted in the flowchart of FIGS. 6-13, and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processors 112a-112n or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote system, such as a server 136, to requesting computer system 100 by way of data signals embodied in a carrier wave or other propagation medium via a network link 134 (e.g. a modem or network connection) to a communications interface 132 coupled to bus 122. Communications interface 132 provides a data communications coupling to network link 134 that may be connected, for example, to a local area network (LAN), wide area network (WAN), or directly to an Internet Service Provider (ISP). In particular, network link 134 may provide wired and/or wireless network communications to one or more networks.

Network link 134 in turn provides data communication services through network 102. Network 102 may refer to the worldwide collection of networks and gateways that use a particular protocol, such as Transmission Control Protocol (TCP) and Internet Protocol (IP), to communicate with one another. Network link 134 and network 102 both use electrical, electromagnetic, or optical signals that carry digital data streams. The signals through the various networks and the signals on network link 134 and through communication interface 132, which carry the digital data to and from computer system 100, are exemplary forms of carrier waves transporting the information.

In addition to server 136, any number of computers and other devices may be networked through network 102. Further, operating system 142, JVM 140, and various applications, programs, objects, modules and other processes may execute on one or more processors in server 136 and other computer systems accessible via network 102 in a distributed environment. In particular, when implemented as a server system, computer system 100 typically includes multiple communication interfaces accessible via multiple peripheral component interconnect (PCI) bus bridges connected to an input/output controller. In this manner, computer system 100 allows connections to multiple networked accessible computers.

In addition, computer system 100 typically includes multiple peripheral components that facilitate communication. These peripheral components are connected to multiple controllers, adapters, and expansion slots coupled to one of the multiple levels of bus 122 and herein referred to by I/O interface 130.

Those of ordinary skill in the art will appreciate that the hardware depicted in FIG. 1 may vary and can be implemented within multiple types of systems. For example, computer 100 can be a standard computer or server, but can also be an embedded system, such as a set top box, handheld device, or any other hardware device including a processor and JVM 140. Furthermore, those of ordinary skill in the art will appreciate that the depicted example is not meant to imply architectural limitations with respect to the present invention.

Figure 2:
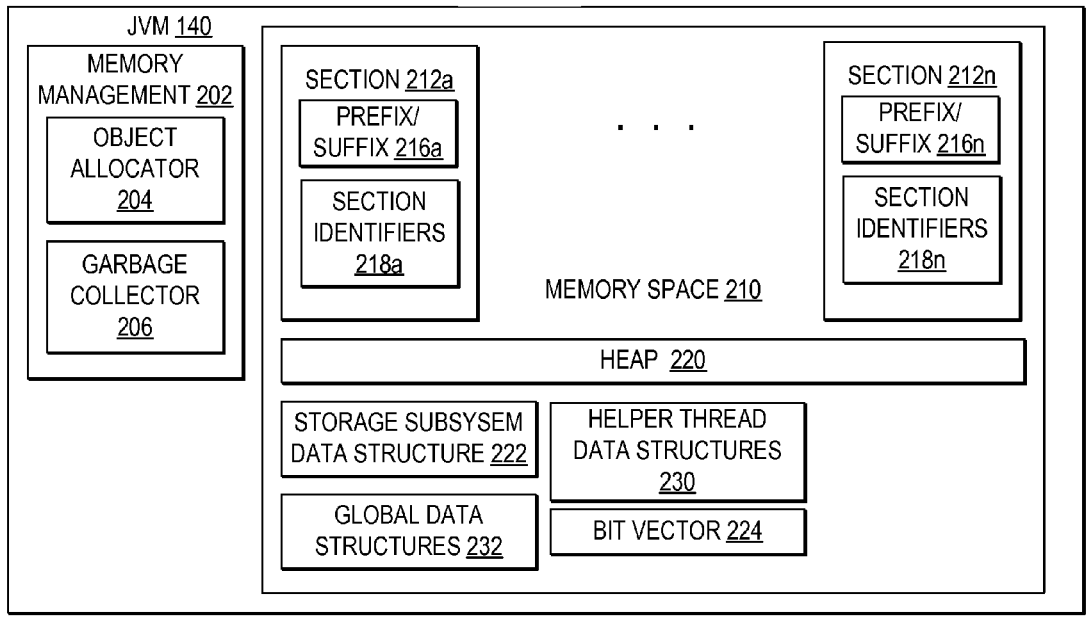
FIG. 2 is a block diagram depicting the memory management and allocation within a JVM in accordance with the method, system, and program of the present invention

With reference now to FIG. 2, a block diagram depicts a block diagram of the memory management and allocation within a JVM in accordance with the method, system, and program of the present invention. As depicted, JVM 140 includes a memory management controller 202, in addition to interpreters, controllers, and other components not depicted, but typically implemented within a JVM.

Initially, memory management controller 202 requests memory space 210 from the operating system for storing objects and data for a Java application. In the embodiment depicted, memory management controller 202 is a component of JVM 140, however it will be understood that memory management controller 202 may be located within other software systems. Further, it will be understood that memory management controller 202 may include processes that can be invoked by application threads and may also invoke threads to perform memory management processes.

In one embodiment, memory space 210 includes is a contiguous block of memory, called the heap. Same sized blocks of heap 220 are represented by bits in an independent bit vector 224. For example, 8-byte blocks of heap 220 may each be represented by a bit in independent bit vector 224.

In this example of a multiprocessor system, heap 220 is assigned among multiple sections 212a-212n. Each of sections 212a-212n is represented by a data structure that including section identifiers 218a-218n that identify the portions of heap 220 and bit vector 224 assigned to each section. In addition, the data structures representing each of sections 212a-212n include prefix and suffix fields 216a-216n that identify the number of consecutive zero bits at the beginning and end of a section. The prefix field that identifies the number of consecutive zero bits at the beginning of a section and the suffix field identifies the amount of free space at the end of a section or if there is no free space, the number of bytes a marked object projects into subsequent sections.

Memory management controller 202 includes an object allocator 204 and a garbage collector 206. Object allocator 204 provides inviolable processes for enabling the allocation of free space of heap 220 to objects needed for execution of a Java application. Garbage collector 206 controls the deletion of objects from heap 220 when those objects are no longer required. In particular, an advantage of the Java programming language is that Java applications do not need to specifically control the allocation or deal location of memory, rather the allocation and deal location of memory is controlled by JVM 200.

Figure 3:
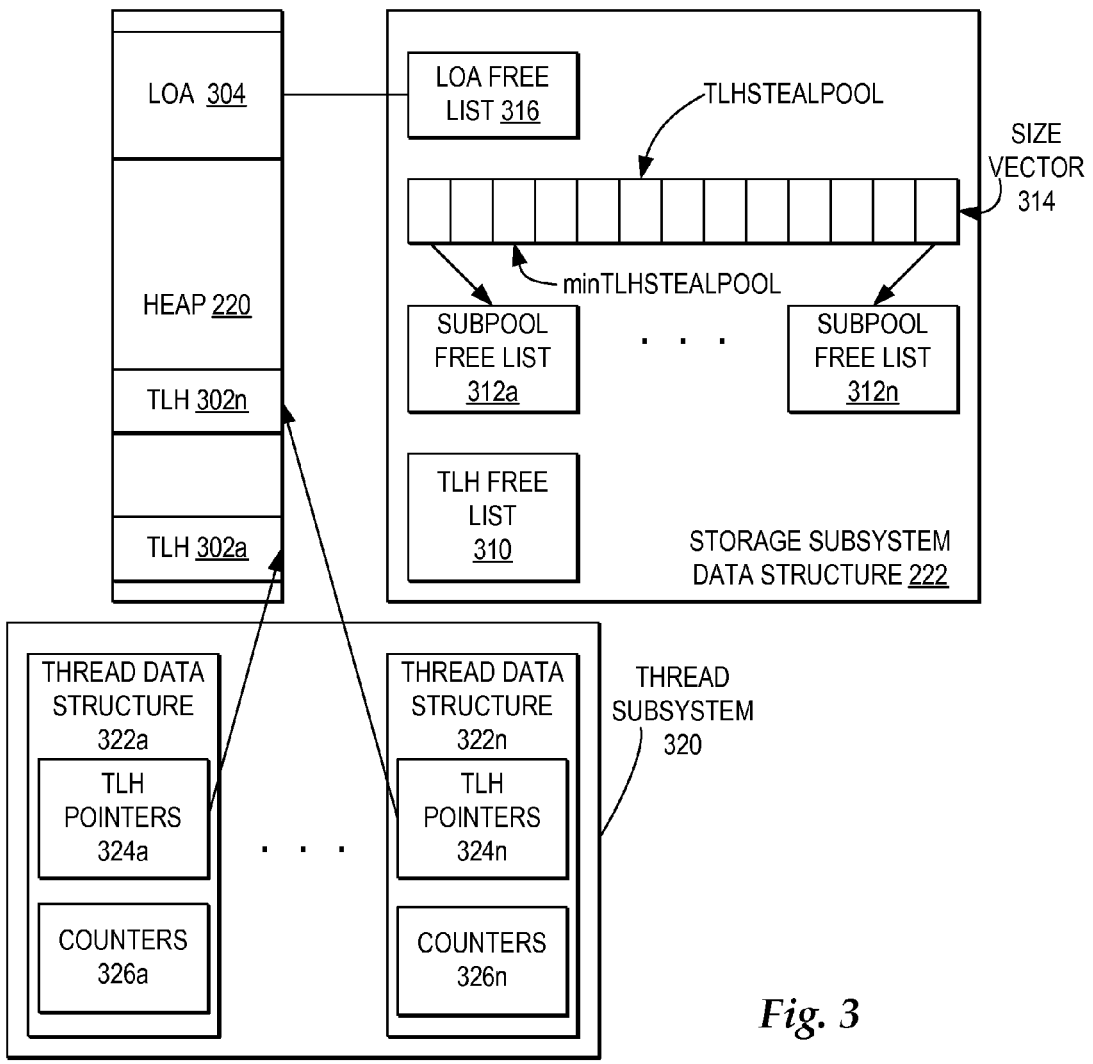
FIG. 3 is a block diagram depicting multiple free lists from which efficient object allocation may be performed in accordance with the method, system, and program of the present invention.

When an allocation request is received from an application thread, a storage subsystem data structure 222 is searched for a free item of sufficient size to meet the allocation request. As will be described in detail in FIG. 3, storage subsystem data structure 222 may include multiple free lists, including a TLH free list, subpool free lists, and an LOA free list. According to an advantage of the invention, as free items are allocated, each application thread records information about each allocation. If a free item of sufficient size to meet the allocation request cannot be located, then an allocation failure occurs and garbage collector 206 is invoked.

According to an advantage of the invention, when garbage collector 206 is invoked, garbage collector 206 initially accumulates the recent allocation history from each of the application threads into multiple counters and arrays within global data structures 232. Based on the recent allocation history and prior allocation requirements, future allocation predictions are made and a preferred distribution of free lists and the number of items needed for each free list are adjusted based on the future allocation predictions.

Garbage collector 206 may perform garbage collection using mark and sweep phases, for example. During a mark phase, objects that are still actively referenced in heap 220 are identified and the bit in a bit vector 224 that corresponds to the first byte of each referenced object is marked.

Next, during garbage collection, in a phase commonly referred to as the "sweep phase", sufficient helper threads are initiated to use all of the available processors. Each of the helper threads initializes a data structure within helper thread data structures 230. As will be described in more detail with reference to FIG. 4, each helper thread data structure includes a set of queues for each subpool and counters and a TLH queue and counter. Each of the helper threads may perform an atomic operation to acquire the next unprocessed section from among sections 212a-212n and efficiently identify free space. In particular, in one example, also described in U.S. patent application Ser. No. 10/862,137 each helper thread scans the portion of the bit array assigned to a section to locate the first marked bit. If no marked bit is found, then the prefix value is set to the number of bits in the portion of the bit array and the next section, if any, is acquired. If a marked bit is found, the number of preceding zero bits is stored in the prefix field of the section data structure. The helper thread counter is reset and incremented for each zero in a consecutive sequence following the marked bit. If the counter value exceeds a threshold, then the size of the marked object is fetched and the size indicated by the counter bits is subtracted from the size of the marked object. If the marked object size exceeds the size indicated by the counter bits, then the remainder of the bits representing the marked object are skipped and any consecutive sequence of zero bits following the marked object bits are counted. Advantageously, by fetching the size of a marked object once the marked object represents the size of a potentially free item, not all the bits of a larger marked object need be scanned.

Once the end of the section or a marked bit is detected, if a consecutive sequence of zero bits exceeds a threshold, then the sequence of zero bits is considered a free item and the helper thread determines which of the subpool queues or TLH queue on which the free item should be placed. Further, in particular, when the end of the section is reached, the size indicated by the current counter is subtracted from last marked object size and the value is stored in the suffix field of the section's data structure. In one example, the suffix value will be a zero if the object ends at the boundary, negative if the object extends beyond the boundary, or positive if there is free storage at the end of the section.

Once all the helper threads complete the sweep of sections 212a-212n, garbage collector 206 acquires a lock on execution by any other Java processes and executes a single thread. The single thread collects all the free items stored in helper thread data structures 230 and distributes the free items among the free lists in storage subsystem data structure 222. In addition, the single thread collects all the prefix/suffix values 216a-216n and identifies free items of sufficient size that overlap sections for placement in one of the free lists in storage subsystem data structure 222. In one example, free items are distributed among the free lists in storage subsystem data structure 222 according to the preferred distribution determined by garbage collector 206 at the onset of garbage collection, however, the distribution may be adjusted to reflect the actual sizes of free items found during garbage collection Referring now to FIG. 3, there is depicted a block diagram of multiple free lists from which efficient object allocation may be performed in accordance with the method, system, and program of the present invention. As illustrated, multiple free lists are managed within storage subsystem data structure 222. In the example, the free lists include an LOA free list 316, subpool free lists 312a-312n, and a TLH free list 310.

In one embodiment, TLH free list 310 references free items within heap 220 that range in size from a minimum TLH size to a maximum TLH size. Free items in TLH free list 310 may be popped from TLH free list 310 and used to replenish TLHs used by different application threads. In particular, each application thread implements one of thread data structures 322a-322n within a thread subsystem 320. Thread data structures 322a-322n respectively include TLH pointers 324a-324n. The TLH pointers for each thread data structure include pointers to the location of a TLH allocated to the thread data structures. For example, TLH pointers 324a point to a space indicated by TLH 302a in heap 300 and TLH pointers 324n point to a space indicated by TLH 302n in heap 300. Thus, when a free item is popped from TLH free list 310 and used to replenish a TLH for a thread data structure, the TLH pointers for the data structures are reset to the address of the free item within heap 220. It is important to note that allocations by threads to TLHs are fast because a thread need not acquire heap lock, but rather the thread allocates from the thread's TLH and adjusts the TLH pointers to indicate the space remaining on the thread's TLH.

It is important to note that advantageously, any of thread data structures 322a-322n can access TLH free list 310 and replenish a TLH using an atomic operation, and thus are not required to acquire heap lock for TLH replenishment from TLH free list 310. However, an application thread may be required to acquire a share of a delayGC lock when acquiring a free item to replenish a TLH from TLH free list 310. The delayGC lock is a shared lock that, when held, postpones stop-the-word garbage collection. In addition to the delayGC lock, other techniques may also be employed to insure that garbage collection does not occur while a thread is acquiring a TLH from TLH free list 310.

In addition, in one embodiment, LOA free list 316 includes free items from within the range of storage designated for LOA 304. In particular, when implemented, LOA 304 is a dedicated storage area for objects that exceed a large object size. In one example, free items from LOA free list 316 can only be allocated to if the requested size exceeds to the large object size, however, LOA free list items may be divided to avoid a premature garbage collection or forced compaction. LOA 304 and LOA free list 316 may be allocated or deallocated as needed for efficient free item distribution to avoid premature garbage collection or forced compaction.

Further, in one embodiment, subpool free lists 312a-312n each represent pools of free items of a range of sizes. In one embodiment, free items placed on a particular subpool free list are at least as large as the indexed size, but less than the next larger indexed size. In addition, items placed in the last subpool may contain free items as large as the maximum object size for the heap.

To improve the efficiency of locating a free item of sufficient size in subpool free lists 312a-312n, a size vector 314 can be searched for the first size as large as the requested size. In particular, size vector 314 indexes the minimum sizes of subpool free lists 312a-312n.

According to one advantage, although depicted within storage subsystem data structure 222, size vector 314 may be redundantly maintained in the cache of each processor of a system or in other quickly accessible memory locations. In particular, the sizes in size vector 314 are typically only changed during garbage collection, but are referenced often during allocation and thus can be shared across multiple processor caches.

In one example, application threads first determine whether a requested allocation can be satisfied within the thread's TLH. If sufficient space is not available within the thread's TLH and the requested size is smaller than a maximum TLH size (maxTLHSize), then an attempt is made to pop an item from TLH free list 310. If the attempt succeeds, then the free item is used to replenish the TLH pointed to by the thread's data structure.

In the example, if, however, TLH free list 310 is searched and found empty, then a heap lock may be acquired and a free item from one of subpool free lists 312a-312n located to replenish the thread's TLH. In particular, when a search of size vector 314 is initiated for a TLH replenishment, the search may start at the position in size vector 314 pointed to by TLHStealPool and only search the smaller sized subpools, as marked by the boundary of minTLHStealPool, if the TLH replenishment request cannot be met by one of the larger subpools. In particular, by controlling the boundaries of TLH replenishment by the TLHStealPool and minTLHStealPool values, a policy is implemented requiring TLH replenishment first from larger subpools and then by smaller subpools only when larger subpools are exhausted. As a result, TLH replenishment does not deplete all the smaller subpools first and thus avoids premature garbage collection. In addition, by setting minTLHStealPool to a subpool size that is at least as large as the TLH size, only those subpools with free items of sufficient size to be a TLH are accessed.

In addition, in the example, if the allocation request size is larger than a maximum TLH size, then a heap lock is acquired and the allocation is satisfied from one of subpool free lists 312a-312n or garbage collection is initiated. First, size vector 314 is scanned looking for the first size that is at least as large as the allocation requested size. If a size at least as large as the requested size is located, the size is set as the original target pool. If the original target pool is not empty, then the first item is popped from the list and used to satisfy the request. If the original target pool is empty, then subsequent pools indicated in size vector 314 are scanned to determine if any are not empty. If the subsequent pools are all empty and the requested size is smaller than the target pool, the pool preceding the target pool may be searched for a free item of sufficient size to satisfy the request.

Further, if a TLH cannot satisfy the allocation request, the request size is at least the size of the minimum LOA object size, and no free item is available from the subpool free lists, then LOA free list 316 may be searched. In one embodiment, LOA is an optional reserve area of the heap that is advantageously used to allocate large objects, thereby reducing the possibility of fragmentation among large items. In particular, in one embodiment, since the largest subpool may include items as large as the minimum LOA object size, the LOA is effectively only accessed when the largest subpool is empty.

In general, whenever a free item of sufficient size is located from subpool free lists 312a-312n, the requested size is subtracted from the free item size and if the remaining size is at least as large as the smallest subpool size, the remainder is placed on the appropriate subpool from among subpool free lists 312a-312n. Otherwise, the remainder is discarded.

According to an advantage, bookkeeping may be performed in conjunction with object allocation to provide recent allocation history that can be used to predict future allocation requirements during the next garbage collection cycle. In particular, as will be further described with reference to FIG. 4, each application thread may maintain counters 326a-326n that are updated during object allocation and TLH replenishment.

Figure 4:
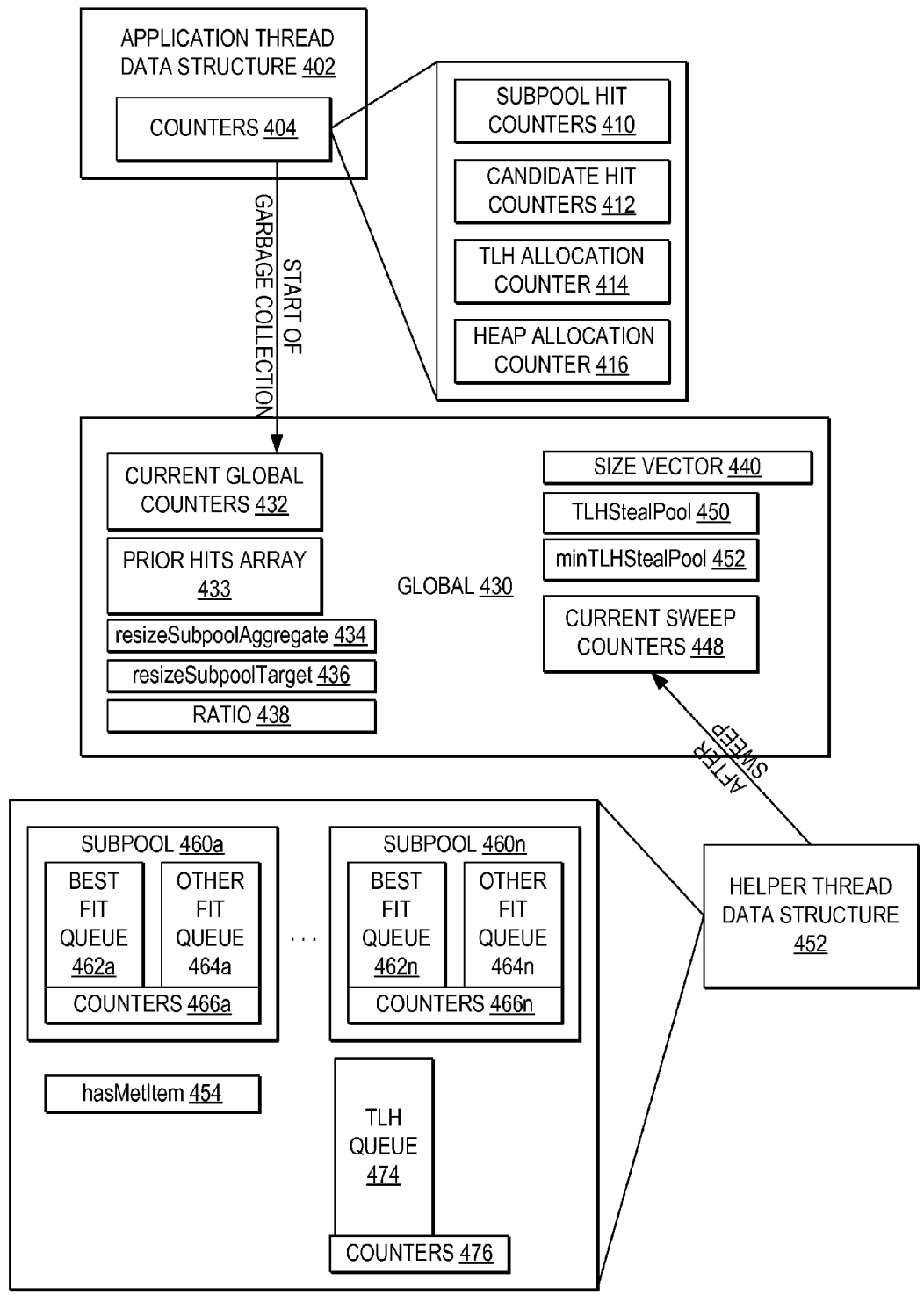
FIG. 4 is a block diagram depicting the information tracked to enable prediction of future allocation requirements and distribute free items according to the future allocation requirements in accordance with method, system, and program of the present invention

With reference now to FIG. 4, there is depicted a block diagram of the information tracked to enable prediction of future allocation requirements and distribute free items according to the future allocation requirements in accordance with method, system, and program of the present invention. During the allocation process, different application threads may search for free items to allocate to a new object. As described with reference to FIG. 3, each application thread creates and maintains an independent local data structure within thread subsystem 320. In the example depicted in FIG. 4, counters 404 of a thread data structure 402 are amplified. In particular, Counters 404 may include multiple types of counters including, but not limited to, subpool hit counters 410, candidate hit counters 412, a TLH allocation counter 412, and heap allocation counter 416.

TABLE 1

Hit Counter for Subpool Allocations

| Subpool Sizes | Hits | Potential Candidates | Hits |
| --- | --- | --- | --- |
| 8 | 5 | 12 | 1 |
| 16 | 2 | 24 | 3 |
| 48 | 10 | | |
| 64 | 30 | | |

Table 1 illustrates one example of how a thread tracks allocations in subpool hit counters 410 and candidate hit counters 412 for bookkeeping. In the example, if the requested size exactly matches the target pool size, then that pool's thread local hit counter is incremented. For example, if the requested size is 8, then the counter corresponding to the subpool size of 8 is incremented from 5 hits to 6 hits. Otherwise, if the requested size does not exactly match the target pool size, then the requested size becomes a candidate for a future subpool. If the requested size is already included in the list of potential candidate sizes, then the hit counter for the matching potential candidate size is incremented; otherwise, if there is sufficient room in the list a new candidate size is added and the hit counter for the new candidate size is set to 1. For example, if the requested size is 12, then the counter corresponding to the candidate size of 12 is incremented from 1 hit to 2 hits; if the requested size is 52, then a potential candidate size of 52 is added to the potential candidate sizes list and the counter corresponding to potential candidate 52 is set to 1 hit.

At the start of garbage collection, the local counters from each thread's data structure, such as local counters 404, are accumulated into corresponding global counters 432. Next, a free list distribution process begins that may dynamically adjust the number and sizes of subpool free lists listed and the TLHStealPool field 450 and minTLHStealPool field 452 based on recent allocation history.

In one example, first, according to the counters accumulated in current global counters 432, a resizeSubpoolAggregate field 434 is incremented by the total amount of storage allocated from the heap since the last garbage collection as calculated by the local counters such as heap allocation counter 416. A resizeSubpoolTarget field 436 is maintained that designates the amount of available free space after the last garbage collection after subpools were established. Next, a ratio field 438 is set to the fraction of resizeSubpoolTarget field 436 divided by resizeSubpoolAggregate field 434. In one embodiment, however, the subpools are not altered until the resizeSubpoolAggregate is at least as large as the resizeSubpoolTarget to avoid subpool reassignment based on an inadequate number of allocations.

In predicting future allocation requirements and adjusting free list distribution requirements, a selection of reserved subpools may be automatically designated. In particular, first, one subpool may be reserved to insure that the largest subpool is at least a certain size, such as 64 k. In addition, when heap utilization is lower than a usage percentage, such as 35%, and no large object allocations were made since the last garbage collection, an addition subpool may be reserved to insure that all TLHs allocated will meet or exceed a minimum size, such as 8 k.

Next, in predicting future allocation requirements and adjusting free list distribution requirements, the candidates aggregated from all the threads in global counters 432 are arranged in size order. Candidates with fewer than 2 hits are removed. Then, the ordered and parsed candidate list is merged with the current subpool list in size vector 440 in size order and all hits are scaled by ratio field 438. In addition, the hits of existing subpools are adjusted by taking the average of the current hits and the previous smoothed hits. Previous smoothed hits are stored in a prior hits array 433 that stores the smoothed hits predicted for the recently completed cycle.

It is important to note that in predicting future allocation requirements, it is advantageous to predict subpool sizes and number of entries needed to most likely match each future allocation request. In particular, it is advantageous for a free item that directly matches the size of an allocation request to be available, rather than a larger free item that has to be divided, such that larger free items are not prematurely divided. Thus, it is important to monitor candidate sizes and the number of hits to candidate sizes and to scale the number of hits based on previous allocations, to predict the needed sizes of subpools and the number of entries needed per subpool.

TABLE 2

Example of a Merged and Scaled Subpool List

| Subpool Size | Previous Smoothed Hits | Current Hits | Scaled Hits |
| --- | --- | --- | --- |
| 550 | 450 | 550 | 500 |
| 600 | | 400 | 400 |
| 700 | | 300 | 300 |
| 1200 | 1200 | 800 | 1000 |
| 1400 | 505 | 495 | 500 |
| 65,536 | 25 | 15 | 20 |

In one example, Table 2 shows the merged subpool list, the previous smoothed hits for the existing subpools, the current hits, and the scaled hits. For purposes of illustration, the hits are not scaled by a ratio, but the existing subpool hits are scaled based on the average of the current hits and the previous smoothed hits. In the example, the subpool sizes of "550", "1200", "1400", and "65,536" are the existing subpool sizes and the subpool sizes of "600" and "700" are the sizes added from the candidate list. The scaled hits are an average of the previous smoothed hits, if any, and the current hits. Previous smoothed hits are the previously predicted number of hits for the recently completed cycle used to determine the free item distribution during the recently completed cycle. It will be understood that when implemented, additional subpool sizes may be added to the list.

Once the hits are scaled for the merged list, if the list is empty, then default arbitrary sizes and hits are used. If the merged list exceeds the maximum number of subpools less the reserved subpools, then the list is contracted by removing the entries with the fewest hits.

Next, the final list of predicted future allocation requirements, including a new subpool size vector and free items needed per subpool is created. In particular, the reserved pools are added to the scaled and merged list, and stored in size vector 440. In addition, the scaled hits are moved to the smoothed hits array to indicate current needs in prior hits array 433 and the current hits array is cleared.

In addition, once the new subpool size vector is determined, the variables TLHStealPool and minTLHStealPool are set to reflect recent heap utilization and large object allocation. In particular, TLHStealPool and minTLHStealPool may need to be adjusted to reflect the change position within the subpool size vector of a target size for TLHStealPool and a minimum size for minTLHStealPool.

In addition, it is important to note that the garbage collector may dynamically determine a needed number of free items for the TLH free list based on recent allocation history. In particular, each allocation thread may count the number of allocations from the TLH free list, such that the garbage collector can compare prior allocations from the TLH free list with current allocations and predict future allocations.

Next, during the sweep phase of garbage collection, the newly assigned subpool free lists are populated based on the smoothed hits stored in prior hits array 433 and the TLH free list is populated to maximize allocations from TLHs. In particular, the new size vector and smoothed hits are the predicted requirements, but there will not necessarily be sufficient free items found during the sweep process to fill the free lists according to the predicted allocation requirements. Thus, during the sweep process, items are placed within the free lists to optimize TLH sizes and use during allocation. In addition, free items are placed on the free lists to avoid prematurely splitting large objects that can lead to premature garbage collection and compactions.

In particular, during the sweep phase, multiple helper threads may execute concurrently to sweep the heap sections and distribute free items among the different free lists. Each helper thread implements a helper thread data structure, such as helper thread data structure 452 to record the results of the sweep of each section. If the garbage collection is a result of an allocation failure, a HasMetItem field 454 is included in the helper thread data structure and is filled to point to the address of the first free item within data structure 452 that can satisfy the requested allocation.

In the example, helper thread data structure 452 includes subpool structures 460a-460n and a TLH queue 474 and counters 476. Counter 476 counts the number of free items and total number of bytes stored in TLH queue 474. It will be understood that additional data structures and counters may be included to record helper thread activity.

Each subpool structure from among subpool structures 460a-460n corresponds with a size in size vector 440. Within each of subpool structures 460a-460n, best fit queues 462a-462n store those free items that are within a particular range of the size and other fit queues 464a-464n store other free items that are greater in size than the subpool size, but less than the size of the next subpool size. Counters 466a-466n count the number of items in each of best fit queues 462a-462n and other fit queues 464a-464n and count the total number of bytes in each of the sets of queues.

In one example, when a free item is located, the helper thread may first attempt to place the free item in one of the subpool queues until the subpool queues meet local quotas. Alternatively, if a free item is not placed in a subpool queue and the free item is large enough to be a TLH, then the free item is placed in TLH queue 474. In particular, if the free item is larger than a TLH maximum size, then the free item is first divided into multiple TLH sized free items that are placed on TLH queue 474.

TABLE 3

Free item values accumulated from the parallel scan

| Subpool Size | Best Fit Chunks Found | Other Chunks Found | Smoothed Hits |
|---|---|---|---|
| 550 | 80 | 500 | 100 |
| 600 | 20 | 400 | 500 |
| 700 | 10 | 300 | 350 |
| 1200 | 30 | 1000 | 400 |
| 1400 | 80 | 500 | 70 |
| 65,536 | 1 | 20 | 0 |

When the helper threads complete a parallel sweep of the sections of the heap the threads enter a suspended state and a single thread accumulates the subpool data structures into a current sweep array 448 and accumulates TLH queue 474 into the TLH free list. In addition, the single thread retrieves the prefix and suffix values set for each section, locates free items of sufficient size that span sections, and places the free items in the accumulated arrays. In one example, Table 3 illustrates the accumulated best fit chunks and other chunks found for each subpool size.

Next, each of the subpool free lists are filled with a number of free items equal to the number of smoothed hits, first with the best fit queue entries, then with the other fit queue entries. Once a subpool free list is filled with the number of entries needed, if the remaining items are larger than the current TLH size, then the remaining free items for the subpool are placed on the TLH free list. In particular, if the remaining free items are larger than a maximum TLH size, the remaining free items may first be divided into TLH sized free items and then placed on the TLH free list. After distributing all the subpool queues from current sweep structures 448, if there are excess free items on the larger pools and the TLH storage amount is less than a target, then the larger free items are divided into TLH sized free items and placed on the TLH free list.

TABLE 4

Free items distributed to the free lists and resulting needs

| Subpool Size | Best Fit Chunk Target | Other Chunks Target | Needed |
|---|---|---|---|
| 550 | 80 | 20 | 100 |
| 600 | 20 | 400 | 500 |
| 700 | 10 | 300 | 350 |
| 1200 | 30 | 450 | 480 |
| 1400 | 70 | 0 | 70 |
| 65,536 | 1 | 20 | 0 |

In one example, Table 4 illustrates the free list entries and needs after the subpool free lists are accommodated. In the example, for the 550 sized subpool, the smoothed hits, as depicted in Table 3, were 100. During the sweep, the 80 best fit free items are added to the free list and 20 of the other free items are added. The remaining 480 free items are added to the TLH free list if the minimum TLH size is 550 or less.

Next, as depicted in Table 3, the 600 and 700 sized subpools are deficient in free items, even after distributing all the free items designated during the sweep for the 600 and 700 sized subpools. According to one advantage, when a subpool is deficient, the amount needed for subsequent subpools may be adjusted to take into account that allocations for the smaller sized pools are expected to be satisfied with free items from the larger pools. In the example, the needed free items for the 1200 sized subpool are increased from the 400 smoothed hits depicted in Table 3 to the 480 needed free items in Table 4 to indicate the expected free items necessary to compensate for the 600 and 700 sized subpool deficiencies.

It is important to note that if a large portion of the total free items are contained in the pools smaller than minTLH-StealPool field 452, then TLHStealPool field 450 may be adjusted. In particular, the pool size reflected in TLH-StealPool field 450 may be reduced so the TLH is replenished from smaller pools first.

Figure 5:
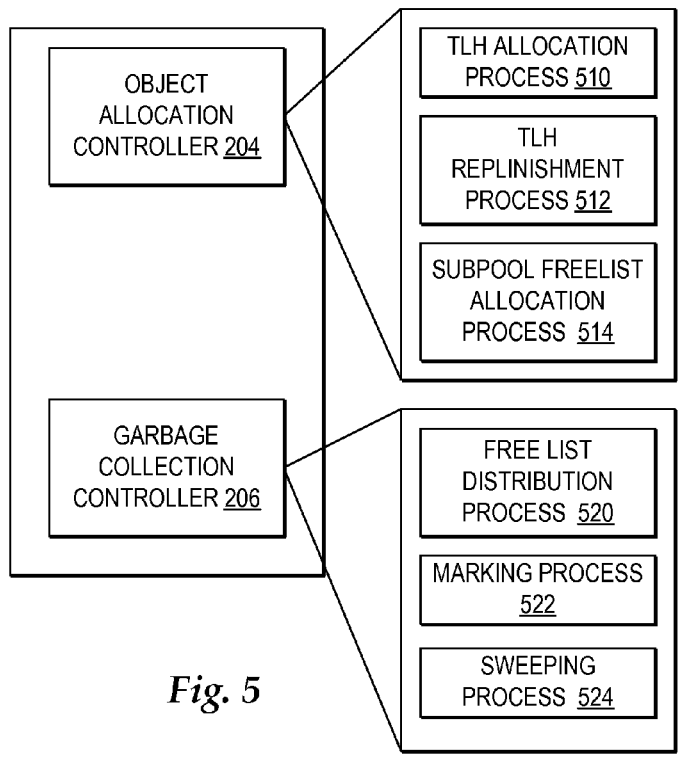
FIG. 5 is a block diagram of the processes controlled by the heap manager in accordance with the method, system, and program of the present invention.

Referring now to FIG. 5, there is depicted a block diagram of the types of processes provided by the heap manager in accordance with the method, system, and program of the present invention. As depicted a heap manager includes an object allocation controller 204 and a garbage collection controller 206.

Figure 7:
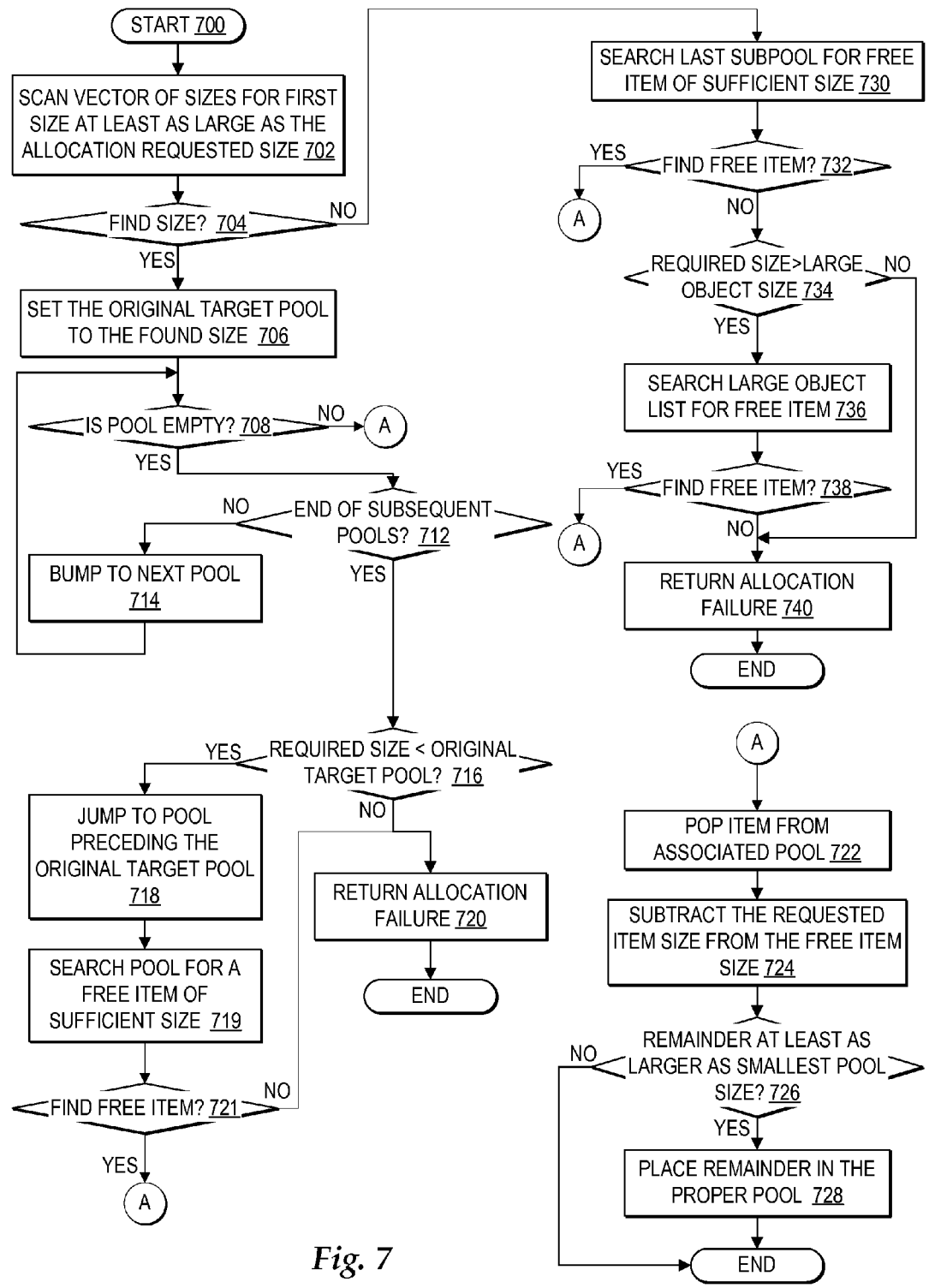
FIG. 7 is a high level logic flowchart of a process and program for determining whether free space is available in the heap responsive to a pools search initiation for object allocation in accordance with the method, system, and program of the present invention.
Figure 8:
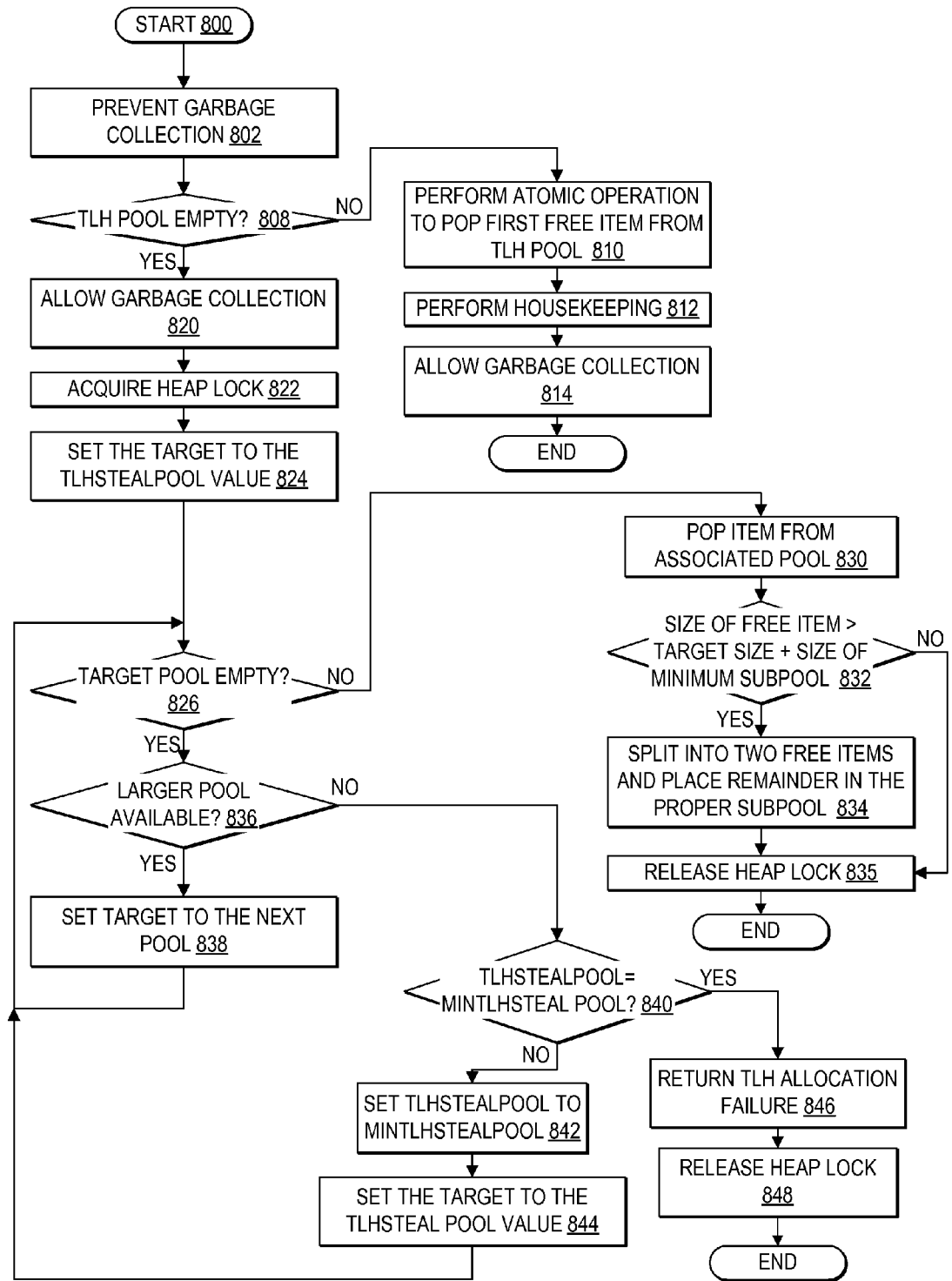
FIG. 8 is a high level logic flowchart depicting a process and program for controlling TLH replenishment in accordance with the method, system, and program of the present invention.

In one embodiment, object allocation controller 204 executes code on behalf of a Java application thread to perform object allocation processes such as invoking object allocation threads that can invoke multiple processes such as a TLH allocation process 510, a TLH replenishment process 512, a subpool freelist allocation process 514, and other processes that enable the object allocation thread to locate a free item of sufficient size for a requested allocation or to invoke garbage collection controller 206. For purposes of reference, FIG. 7 depicts a flowchart showing a process that may be implemented for TLH replenishment process 512. In addition, FIG. 8 depicts a flowchart showing a process that may be implemented for subpool freelist allocation process 514. It will be understood that object allocation controller 204 may be implemented in many ways and may include JIT generated inlined code for efficiently allocating objects from the TLH.

Garbage collection controller 206 may invoke a recent history gathering thread that can invoke multiple process such as a free list distribution process 520 that gathers recent allocation history by each thread and dynamically adjusts the free list distribution parameters. In addition, garbage controller 206 may invoke multiple mark threads that may perform a marking process 522 for marking referenced objects. Further, garbage controller 506 may invoke multiple sweep helper threads that may perform a sweeping process 524 for identifying free items and placing the free items in queues according to the current free list distribution parameters. In addition, garbage collector 506 may invoke a single thread that accumulates the data collected by the helper threads and distributes each free item among the multiple free lists according to the current free list distribution parameters during sweeping process 524.

Figure 6:
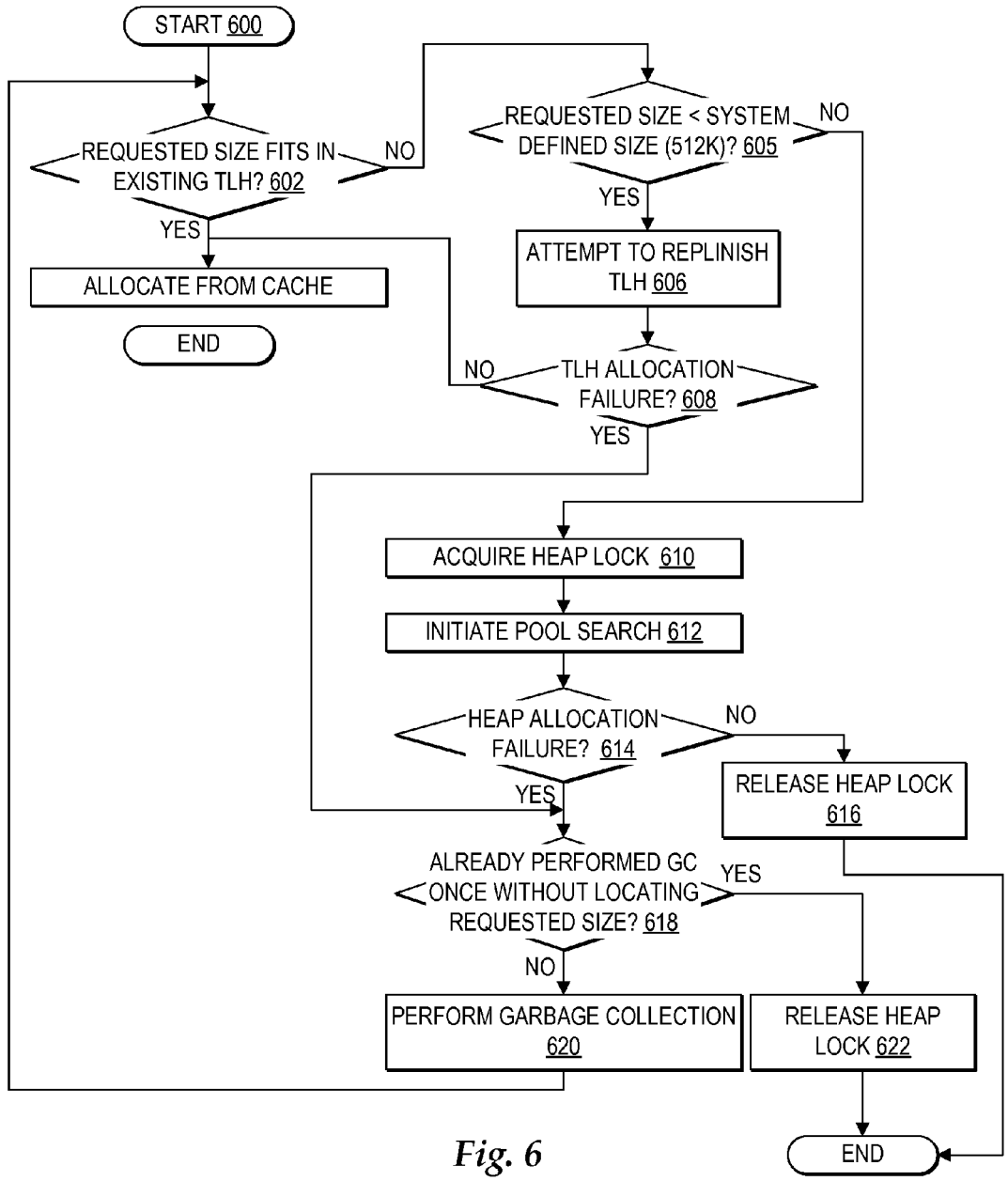
FIG. 6 is a high level logic flowchart depicting a process and program for controlling heap allocation in a JVM in accordance with the method, system, and program of the present invention.

With reference now to FIG. 6, there is depicted a high level logic flowchart of a process and program for controlling heap allocation in a JVM in accordance with the method, system, and program of the present invention. As illustrated, the process starts at block 600 and thereafter proceeds to block 602.

Block 602 depicts a determination whether the requested size for an object allocation fits in the existing TLH (or cache). If the requested size fits in the existing TLH, then the process passes to block 604. Block 604 depicts allocating the requested object from the TLH cache, and the process ends.

Otherwise, at block 602, if the requested size does not fit in the existing cache, then the process passes to block 605. Block 605 depicts a determination whether the requested size is less than the system defined size (e.g. 1 k). If the requested size is not less than the system defined size, then the process passes to block 610, as will be further described. Otherwise, at block 605, if the requested size is less than the system defined size, then the process passes to block 606. Block 606 depicts attempting to replenish the TLH, including acquiring heap lock to attempt to replenish the TLH from a free item in a subpool. Next block 608 depicts a determination whether a TLH allocation failure is detected. If a TLH allocation failure is not detected, then the process passes to block 604. If a TLH allocation failure is detected, then the process passes to block 618.

Block 610 depicts acquiring heap lock. Next, block 612 depicts initiating a pool search for the requested size. Thereafter, block 614 depicts a determination whether a heap allocation failure is detected. If a heap allocation failure is not detected, then the process passes to block 616. Block 616 depicts releasing the heap lock, and the process ends. Otherwise, at block 614, if a heap allocation failure is detected, then the process passes to block 618.

Block 618 depicts a determination whether a garbage collection has already been performed without locating the requested size. If a garbage collection has already been performed without locating the requested size, then the process passes to block 622. Block 622 depicts releasing the heap lock, and the process ends. Otherwise, at block 618, if garbage collection has not already been performed once without locating the requested size, then the process passes to block 620. Block 620 depicts performing garbage collection and the process returns to block 602.

Referring now to FIG. 7, there is depicted a high level logic flowchart of a process and program for determining whether free space is available in the heap responsive to a pools search initiation for object allocation in accordance with the method, system, and program of the present invention. As depicted, the process starts at block 700 and thereafter proceeds to block 702. Block 702 depicts scanning a vector of current pool sizes for the first size at least as large as the allocation requested size. Next, block 704 depicts a determination whether a size at least as large as the requested size is found. If a size is found, then the process passes to block 706.

Block 706 depicts setting the original target pool to the first size found at block 702. Next, block 708 depicts a determination whether the pool is empty. If the pool is not empty, then the process passes to block 722. Block 722 depicts popping the first free item or found free item from the associated pool. Next, block 724 depicts subtracting the requested size from the free item size. Thereafter, block 726 depicts a determination whether the remainder is at least as large as the smallest pool size, or if the item was sourced from the LOA free list, whether the remainder is at least as large as the large object size. If the remainder is not at least as large, then the process ends. If the remainder is at least as large, then the process passes to block 728. Block 728 depicts placing the remainder in the proper pool, and the process ends. In particular, if the free item is popped from the LOA free list pool, then the proper pool is the LOA free list pool.

Returning to block 708, if the pool is empty, then the process passes to block 712. Block 712 depicts a determination whether the end of all subsequent pools is reached. If the end is not reached, then the process passes to block 714. Block 714 depicts bumping to the next pool, and the process returns to block 708. Otherwise, at block 712, if the end of subsequent pools is reached, then the process passes to block 716. Block 716 depicts a determination whether the required size is less than the original target pool size. If the required size is less than the original target pool size, then the process passes to block 718. Block 718 depicts jumping to the pool preceding the original target pool. Next, block 710 depicts searching the pool for a free item of sufficient size. Thereafter, block 721 depicts a determination whether a free item of sufficient size is found. If a free item of sufficient size is not found, then the process passes to block 720. If a free item of sufficient size is found, then the process passes to block 722. Otherwise, returning to block 716, if the required size is not less than the original target pool size, then the process passes to block 720. Block 720 depicts returning an allocation failure, and the process ends.

Returning to block 704, if a size is not found, then the process passes to block 730. Block 730 depicts searching the last subpool for a free item of sufficient size. Next, block 732 depicts a determination whether a free item of sufficient size is found in the last subpool. If a free item of sufficient size is found in the last subpool, then the process passes to block 722, and the process proceeds as previously described. Otherwise, at block 732, if a free item of sufficient size is not found in the last subpool, then the process passes to block 734. Block 734 depicts a determination whether the required size is greater than the large object size. If the required size is greater than the large object size, then the process passes to block 736. Block 736 depicts searching the large object list for a free item of sufficient size. Next, block 738 depicts a determination whether a free item of sufficient size is found. If a free item of sufficient size is found, then the process passes to block 722, and the process proceeds as previously described. Otherwise, at block 738, if a free item is not found, then the process passes to block 740. Block 740 depicts returning an allocation failure, and the process ends. In addition, returning to block 734, if the required size is greater than the large object size, then the process passes to block 740 where an allocation failure is returned.

With reference now to FIG. 8, there is depicted a high level logic flowchart of a process and program for controlling TLH replenishment in accordance with the method, system, and program of the present invention. As depicted, the process starts at block 800 and thereafter proceeds to block 802. Block 802 preventing garbage collection, and the process passes to block 808.

Block 808 depicts a determination whether the TLH pool is empty. If the TLH pool is not empty, then the process passes to block 810. Block 810 depicts performing an atomic operation to pop the first free item from the TLH pool, without requiring a heap lock. Next, block 812 depicts performing housekeeping. Thereafter, block 814 depicts allow garbage collection, and the process ends.

Returning to block 808, if the TLH pool is empty, then the process passes to block 820. Block 820 depicts allowing garbage collection. Next, block 822 depicts acquiring the heap lock. Thereafter, block 824 depicts setting the target pool to the TLHSTEALPOOL value. Next, block 826 depicts a determination of whether the target pool is empty. If the target pool is not empty, then the process passes to block 830.

Block 830 depicts popping the free item from the associated pool. Next, block 832 depicts a determination whether the size of the free item is greater than the target size plus the size of the minimum subpool. If the free item is greater than the target size plus the size of the minimum subpool, then the process passes to block 834; otherwise, the process passes to block 835. Block 834 depicts splitting the free item into two free items and placing the remainder item in the proper subpool, and the process passes to block 835. Block 835 depicts releasing heap lock, and the process ends.

Returning to block 826, if the pool is empty, then the process passes to block 836. Block 836 depicts a determination whether a larger pool is available. If a larger pool is available, then the process passes to block 838. Block 838 depicts setting the target to the next pool, and the process returns to block 826. Otherwise, at block 836, if a larger non-empty pool is not available, then the process passes to block 840. Block 840 depicts a determination whether the TLHStealPool value is equal to the minTLHStealPool value. If the two are not equal, then they are set equal, as depicted at block 842 and the process passes to block 844. Block 844 depicts setting the target pool to the TLHStealPool value, and the process returns to block 826. Otherwise, at block 840, if the two values are equal, the process passes to block 846. Block 846 depicts returning a TLH allocation failure. Next, block 848 depicts releasing heap lock, and the process ends.

Figure 9:
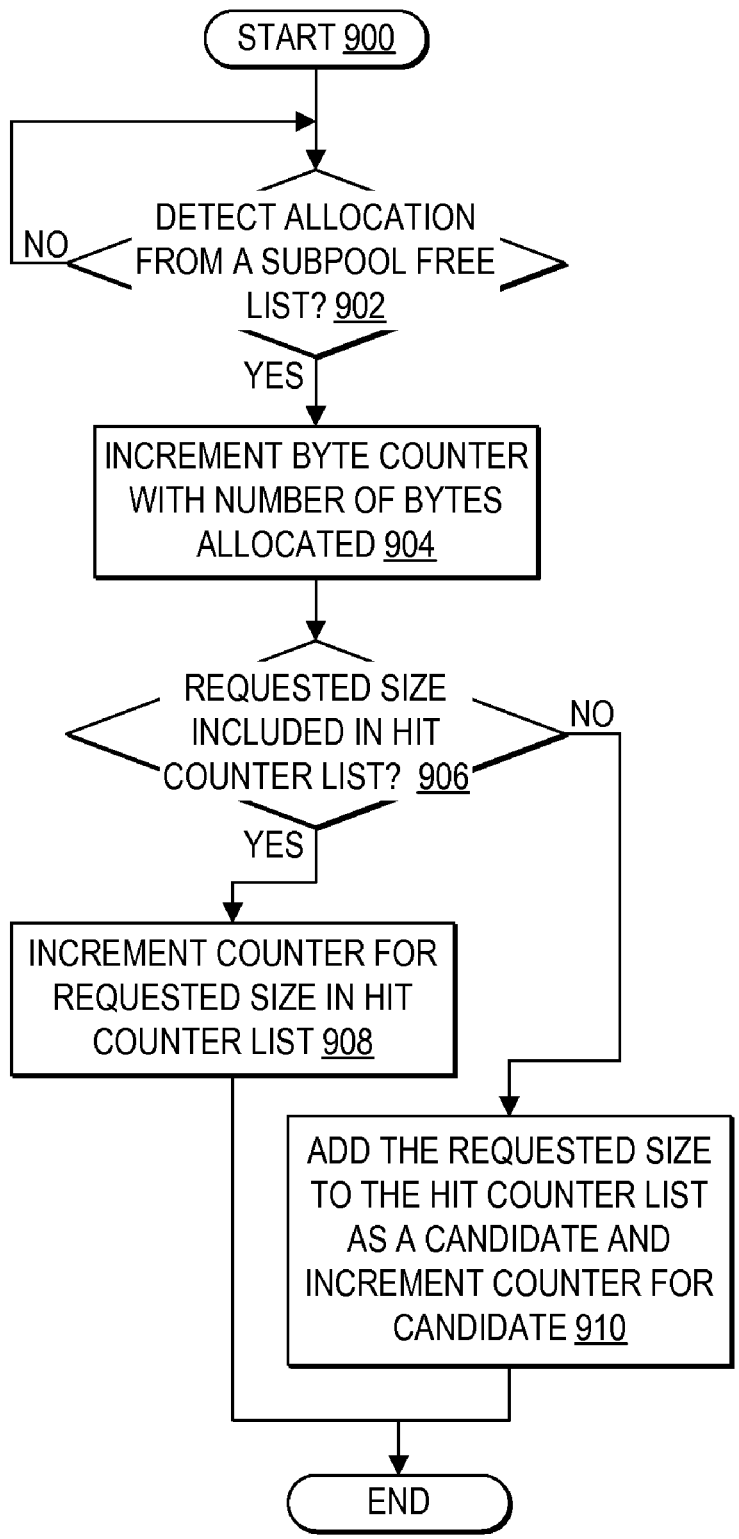
FIG. 9 is a high level logic flowchart depicting a process and program for counting the requested sizes of object allocations in accordance with the method, system, and program of the present invention.

Referring now to FIG. 9, there is depicted a high level logic flowchart of a process and program for counting the requested sizes of object allocations in accordance with the method, system, and program of the present invention. As illustrated, the process starts at block 900 and thereafter proceeds to block 902. Block 902 depicts a determination whether an allocation from a subpool free list is detected. Once an allocation from a subpool free list is detected, then the process passes to block 904. Block 904 depicts incrementing the byte counter with the number of bytes allocation. Next, block 906 depicts a determination whether the requested size of the allocation is included in the hit counter list. If the requested size of the allocation is included in the hit counter list, then the process passes to block 908. Block 908 depicts incrementing the counter for the requested size in the hit counter list, and the process ends. Otherwise, if the requested size is not included in the hit counter list, then the process passes to block 910. Block 910 depicts locating an existing candidate or adding the requested size to the hit counter list as a candidate and incrementing the counter for the candidate, and the process ends.

Figure 10:
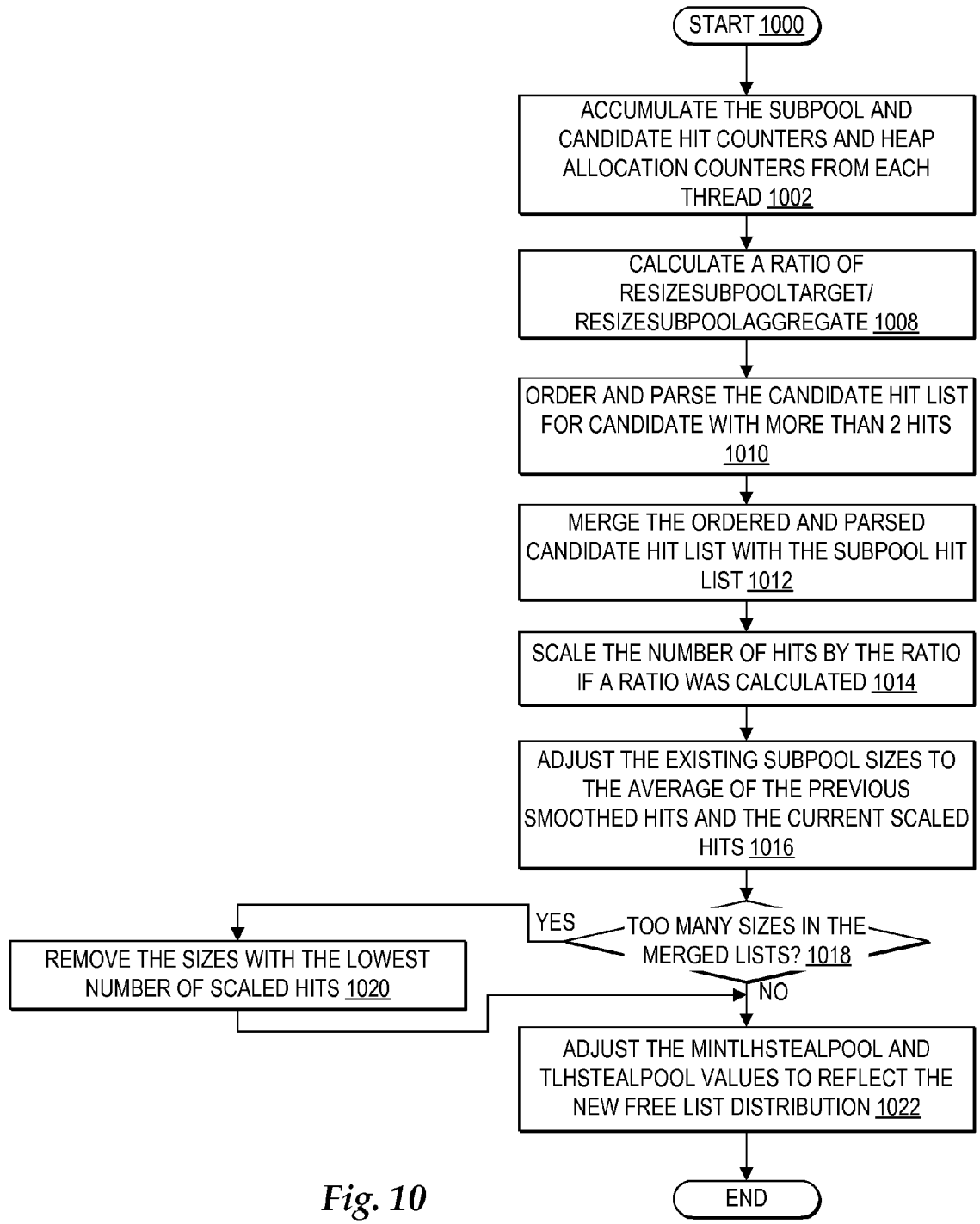
FIG. 10 is a high level logic flowchart depicting a process and program for predicting future allocation requirements and dynamically adjusting distribution requirements at the start of garbage collection in accordance with the method, system, and program of the present invention.

With reference now to FIG. 10, there is depicted a high level logic flowchart of a process and program for predicting future allocation requirements and dynamically adjusting distribution requirements at the start of garbage collection in accordance with the method, system, and program of the present invention. As depicted, the process starts at block 1000 and thereafter proceeds to block 1002. Block 1002 depicts accumulating the subpool and candidate hit counters and heap allocation counters from each thread. Next, block 1008 depicts calculating a ratio of the resizeSubpoolTarget value divided by the resizeSubpoolAggregate value, and the process passes to block 1010. Otherwise, at block 1006, if not too much was allocated, then the process passes to block 1010.

Block 1010 depicts ordering and parsing the candidate hit list for candidates with more than 2 hits. Next, block 1012 depicts merging the ordered and parsed candidate hit list with the existing subpool hit list. Thereafter, block 1014 depicts scaling the number of hits by the ratio. Next, block 1016 depicts adjusting the existing subpool sizes to the average of the previous smoothed hits and the current scaled hits, and the process passes to block 1018.

Block 1018 depicts a determination whether too many sizes are in the merged lists. If too many sizes are in the merged lists, then the process passes to block 1020. Block 1020 depicts removing the sizes with the lowest number of scaled hits, and the process passes to block 1022. Otherwise, at block 1018, if there are not too many sizes in the merged lists, then the process passes to block 1022. Block 1022 depicts adjusting the minTLHStealPool and TLHStealPool values to reflect the new free list distribution.

Figure 11:
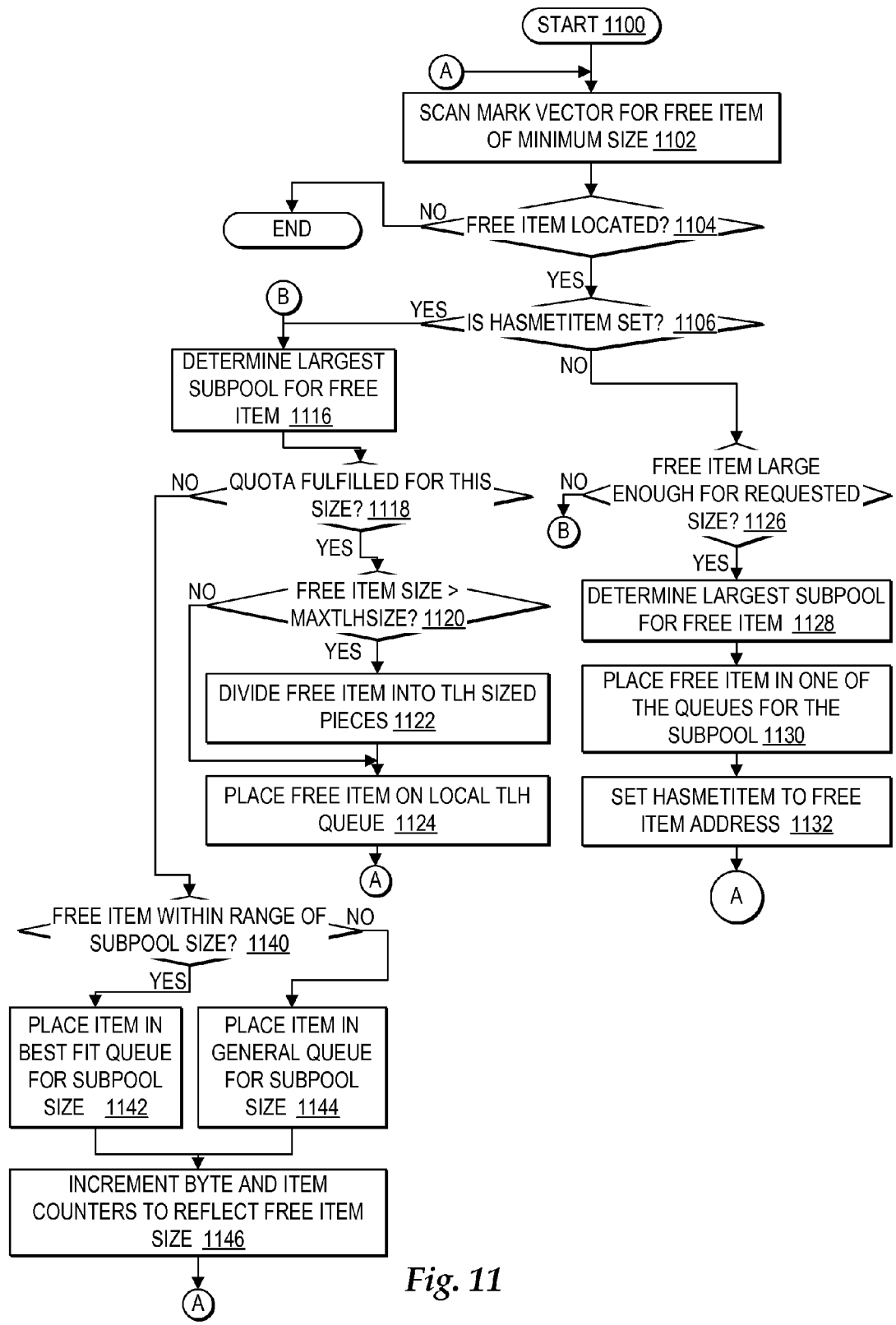
FIG. 11 is a high level logic flowchart depicting a process and program for controlling each helper thread during the sweep process in accordance with the method, system, and program of the present invention.

With reference now to FIG. 11, there is depicted a high level logic flowchart of a process and program for controlling each helper thread during the sweep process in accordance with the method, system, and program of the present invention. As depicted, the process starts at block 1100 and thereafter proceeds to block 1102. Block 1102 depicts scanning the mark vector for a free item of minimum size. Next, block 1104 depicts a determination whether a free item of minimum size is located within the mark vector. If a free item of minimum size is not located, then the process ends. If a free item of minimum size is located, then the process passes to block 1106. Block 1106 depicts a determination whether the hasMetItem field is set to an address of a free item of sufficient size to meet an object allocation request. In particular, if the garbage collection is not initiated as a result of a failed allocation, then hasMetItem will be automatically set to avoid searching for a free item of sufficient size. If hasMetItem has not been set, then the process passes to block 1126.

Block 1126 depicts a determination whether the free item is sufficient for the requested size. If the free item is of sufficient size, then the process passes to block 1128. Block 1128 depicts determining the largest subpool for the free item. Next, block 1130 depicts placing the free item in the appropriate queue for the subpool. Then, block 1132 depicts setting hasMetItem to the free item address, and the process returns to block 1102. Otherwise, at block 1126, if the free item is not sufficient for the requested size, then the process passes to block 1116, as will be further described.

Returning to block 1106, if hasMetItem is already set, then the process passes to block 1116. Block 1116 depicts determining the largest subpool for the free item. Then, block 1118 depicts a determination whether the quota is filled for this size. If the quota is filled for the size, then the process passes to block 1120. Block 1120 depicts a determination whether the free item size is greater than the maxTLHsize value. If the free item size is greater than the maxTLHsize value, then the process passes to block 1122. Block 1122 depicts dividing the free item into TLH sized pieces. Next, block 1124 depicts placing the free item on the local TLH queue, and the process returns to block 1102. Otherwise, at block 1120, if the free item size is not greater than the maxTLHsize value, then the process passes to block 1124.

Returning to block 1118, if the quota is not filled for the size, then the process passes to block 1140. Block 1140 depicts a determination whether the free item is within the best fit range for the subpool. If the free item is within the best fit range, then the process passes to block 1142. Block 1142 depicts placing the free item in the best fit queue for the subpool size. Next, block 1146 depicts incrementing the byte and item counters to reflect the free item size, and the process returns to block 1102. Otherwise, at block 1140, if the free item is not within the best fit range, then the process passes to block 1144. Block 1144 depicts placing the item in a general queue for the subpool size, and the process passes to block 1146.

Figure 12:
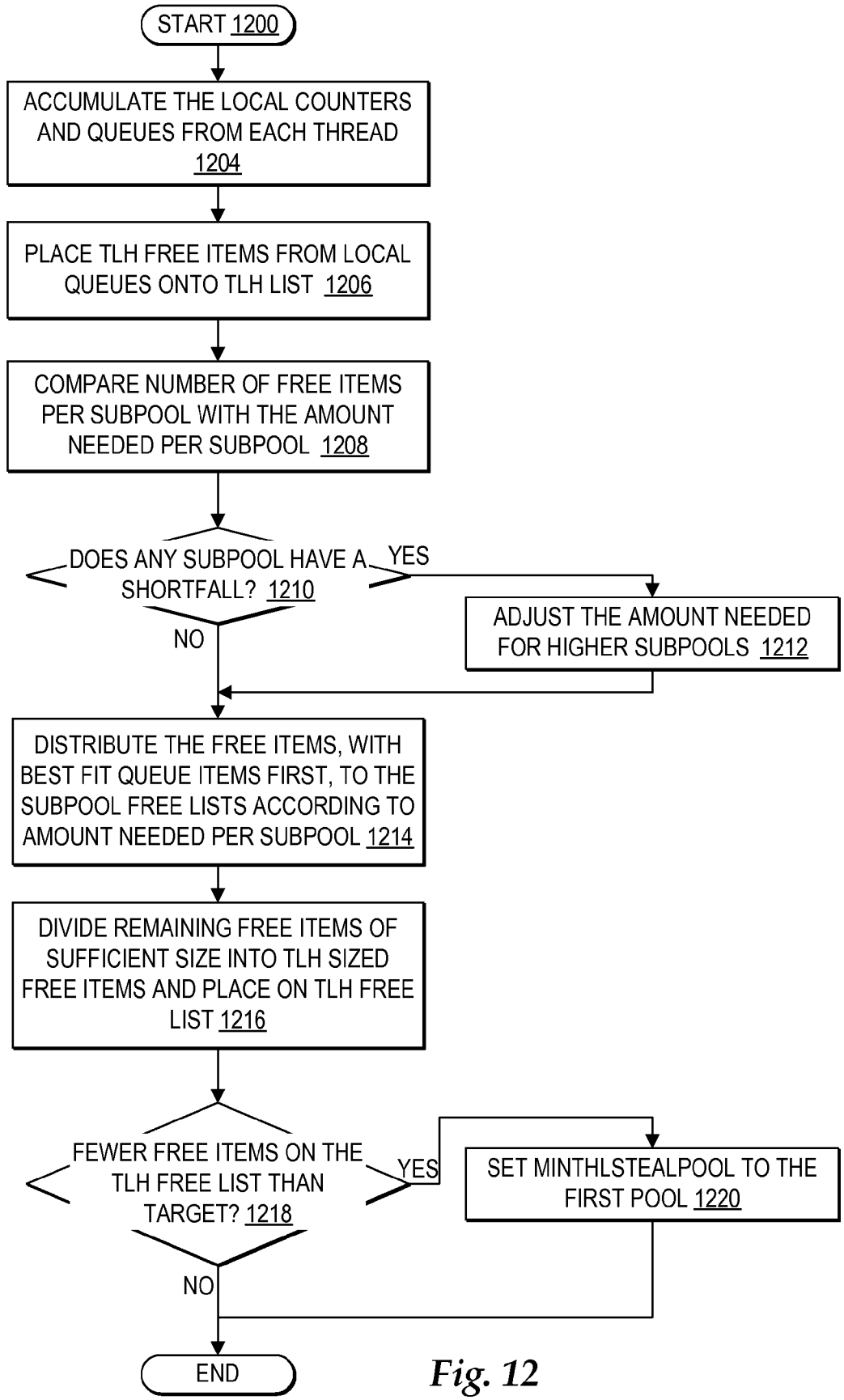
FIG. 12 is a high level logic flowchart of a process and program for controlling the distribution of free items by the main thread during the sweep process in accordance with the method, system, and program of the present invention.

Referring now to FIG. 12, there is depicted a high level logic flowchart of a process and program for controlling the distribution of free items by the main thread during the sweep process in accordance with the method, system, and program of the present invention. As depicted, the process starts at block 1200 and thereafter proceeds to block 1202. Block 1202 depicts accumulating the local counters and queues from each thread. Next, block 1206 depicts placing the TLH local queue items on the TLH free list. Thereafter, block 1208 depicts comparing the number of free items per subpool with the amount of items need per subpool. Next, block 1210 depicts a determination whether any subpool has a shortfall. If a subpool has a shortfall, then the process passes to block 1212. Block 1212 depicts adjusting the amounts needed for higher subpools to compensate for the previous pools shortfalls, and the process passes to block 1214. Otherwise, at block 1210, if none of the subpools has a shortfall, then the process passes to block 1214.

Block 1214 depicts distributing the free items, with the best fit queue items first, to the subpool free lists according to the amount of free items needed per subpool. Next, block 1216 depicts dividing the remaining free items of sufficient size into TLH sized free items and placing the divided free items on the TLH free list. Thereafter, block 1218 depicts a determination whether there are fewer free items on the TLH free list than the target number of items. If there are not fewer free items than expected, the process ends. If there are fewer free items than expected, then the process passes to block 1220. Block 1220 depicts setting the minTLHStealPool value to the first pool, and the process ends.

While the invention has been particularly shown and described with reference to a preferred embodiment, it will be understood by those skilled in the art that various changes in form and detail may be made therein without departing from the spirit and scope of the invention.

What is claimed is:

1. A system for efficient thread-local heap replenishment, comprising:

a heap manager for managing a heap comprising a plurality of thread-local heaps, a thread-local heap free list accessible to said plurality of thread-local heaps for replenishment without requiring a heap lock for exclusively locking said heap, and a plurality of subpool free lists accessible to said plurality of thread-local heaps for replenishment with said heap lock;

means, responsive to a thread from among a plurality of threads accessing said heap receiving a thread-local heap allocation request wherein a current thread-local heap from among said plurality of thread-local heaps is unable to meet said allocation request and said allocation request is less than a maximum thread-local heap free size, for acquiring a share of a shared lock that postpones garbage collection within said heap without exclusively locking said heap; and means, responsive to locating a free item within said thread-local heap free list, for replenishing said current thread-local heap with said free item, such that said current thread-local heap is efficiently replenished without requiring the acquisition of said heap lock.

2. The system according to claim 1 for efficient thread-local heap replenishment, further comprising:

means, responsive to detecting that said thread-local heap free list is empty, for acquiring said heap lock;

means, responsive to acquiring said heap lock, for searching a size vector starting at a bit in a size vector for managing a separate size minimum of free items within each of said plurality of subpool free lists identified for thread-local heap replenishment for a first size as large as said allocation request;

means, responsive to locating said first size as large as said allocation request, for searching a first free list from among said plurality of subpool free lists associated with said first size for a free item sufficiently large to satisfy said allocation request; and means, responsive to locating said free item, for popping said free item from said first free list and replacing said current thread-local heap with said free item.

3. The system according to claim 2 for efficient thread-local heap replenishment, further comprising:

means, responsive to not locating said free item in said first free list, for searching each of said plurality of subpool free lists associated with each of a plurality of sizes following said first size until said free item is located; and means, responsive to not locating said free item in said plurality of subpool free lists associated with each of said plurality of sizes following said first size, for searching at least one size preceding said first size as identified by a minimum thread-local heap replenishment search pointer.

4. The system according to claim 2 for efficient thread-local heap replenishment, further comprising:

means for comparing a size of said free item with said maximum thread-local heap size; and means, responsive to said size of said free item exceeding said maximum thread-local heap size, for dividing said free item into a first free item of maximum thread-local heap size and a second free item with the remainder of said size of said free item.

5. A computer program product, residing on a computer readable volatile or non-volatile storage medium, for efficient thread-local heap replenishment, said computer program product comprising:

means for managing a heap comprising a plurality of thread-local heaps, a thread-local heap free list accessible to said plurality of thread-local heaps for replenishment without requiring a heap lock for exclusively locking said heap, and a plurality of subpool free lists accessible to said plurality of thread-local heaps for replenishment with said heap lock;

means, responsive to a thread from among a plurality of threads accessing said heap receiving a thread-local heap allocation request wherein a current thread-local heap from among said plurality of thread-local heaps is unable to meet said allocation request and said allocation request is less than a maximum thread-local heap free size, for acquiring a share of a shared lock that postpones garbage collection within said heap without exclusively locking said heap; and means, responsive to locating a free item within said thread-local heap free list, for replenishing said current thread-local heap with said free item, such that said current thread-local heap is efficiently replenished without requiring the acquisition of said heap lock.

6. The computer program product according to claim 5 for efficient thread-local heap replenishment, further comprising:

means, responsive to detecting that said thread-local heap free list is empty, for acquiring said heap lock;

means, responsive to acquiring said heap lock, for searching a size vector starting at a bit in a size vector for managing a separate size minimum of free items within each of said plurality of subpool free lists identified for thread-local heap replenishment for a first size as large as said allocation request;

means, responsive to locating said first size as large as said allocation request, for searching a first free list from among said plurality of subpool free lists associated with said first size for a free item sufficiently large to satisfy said allocation request; and means, responsive to locating said free item, for popping said free item from said first free list and replacing said current thread-local heap with said free item.

7. The computer program product according to claim 6 for efficient thread-local heap replenishment, further comprising:

means, responsive to not locating said free item in said first free list, for searching each of said plurality of subpool free lists associated with each of a plurality of sizes following said first size until said free item is located; and means, responsive to not locating said free item in said plurality of subpool free lists associated with each of said plurality of sizes following said first size, for searching at least one size preceding said first size as identified by a minimum thread-local heap replenishment search pointer.

8. The computer program product according to claim 6 for efficient thread-local heap replenishment, further comprising:

means for comparing a size of said free item with said maximum thread-local heap size; and means, responsive to said size of said free item exceeding said maximum thread-local heap size, for dividing said free item into a first free item of maximum thread-local heap size and a second free item with the remainder of said size of said free item.

* * * * *